United States Patent
Wang (10) Patent No.: US 6,615,372 B1
(45) Date of Patent: Sep. 2, 2003

(54) METHOD OF RETRIEVING AND DISPLAYING PROBLEMATIC INFORMATION ABOUT A PRINTER PRIOR TO A PRINT JOB BEING PRINTED ON THE PRINTER

(75) Inventor: James Wang, Fremont, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/507,746

(22) Filed: Feb. 22, 2000

(51) Int. Cl.[7] .................. H02H 3/05; H03K 19/003; H04B 1/74; H04L 1/22; H05K 10/00
(52) U.S. Cl. .................. 714/46; 714/26; 399/23; 358/1.14; 345/705; 347/19
(58) Field of Search .................. 399/23; 714/46, 714/43, 57, 26; 358/1.14; 345/705–715, 771, 733–740, 963, 970; 347/19

(56) References Cited

U.S. PATENT DOCUMENTS

| | | | | |
|---|---|---|---|---|
| 5,727,135 A | * | 3/1998 | Webb et al. ............... | 358/1.14 |
| 5,937,151 A | * | 8/1999 | Kadota ...................... | 358/1.15 |
| 6,031,623 A | * | 2/2000 | Smith et al. ............... | 358/1.14 |
| 6,115,132 A | * | 9/2000 | Nakatsuma et al. ....... | 358/1.14 |
| 6,160,629 A | * | 12/2000 | Tang et al. .................. | 358/1.1 |
| 6,348,971 B2 | * | 2/2002 | Owa et al. .................. | 358/1.15 |
| 6,401,116 B1 | * | 6/2002 | Okigami ..................... | 709/223 |
| 6,430,711 B1 | * | 8/2002 | Sekizawa ..................... | 714/47 |
| 6,437,876 B1 | * | 8/2002 | Phang et al. ................. | 358/1.2 |
| 6,453,129 B1 | * | 9/2002 | Simpson et al. ............. | 399/23 |

* cited by examiner

Primary Examiner—Robert Beausoliel
Assistant Examiner—Yolanda L. Wilson
(74) Attorney, Agent, or Firm—Oblon, Spivak, McClelland, Maier & Neustadt, P.C.

(57) ABSTRACT

A method of printing a document, for example, on a recording medium of a printer selected by a user. Problematic information is retrieved about the printer in response to the printer being selected and before the print job is sent to the printer. The retrieved problematic information is also displayed to the user. In addition, the problematic information may be retrieved, for example, by transmitting Simple Network Management Protocol (SNMP) commands to the printer, if the computer is connected to the printer via a network, or by transmitting printer job language commands if the computer is connected to the printer via a parallel port.

55 Claims, 5 Drawing Sheets

METHOD OF RETRIEVING AND DISPLAYING PROBLEMATIC INFORMATION ABOUT A PRINTER PRIOR TO A PRINT JOB BEING PRINTED ON THE PRINTER

BACKGROUND OF THE INVENTION

1. Field of the Invention

The present invention relates to a method of retrieving and displaying problematic information about a printer prior to a print job being printed on the printer. The present invention also relates to a computer program product and corresponding graphical user interface for retrieving and displaying the problematic information about the printer.

2. Discussion of the Background

Figure 1:
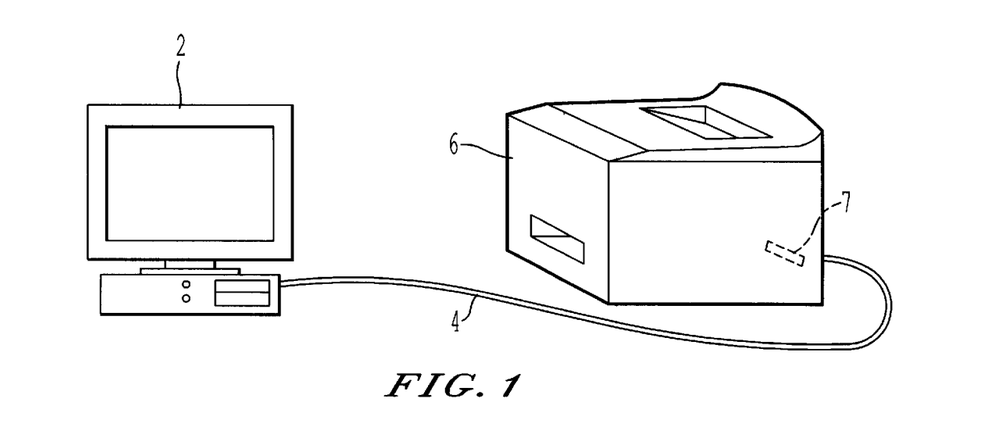
FIG. 1 illustrates a computer connected to a printer.

Many personal computers used at the home or office are directly connected to a printer, i.e., a one-to-one connection. For example, FIG. 1 illustrates a conventional set-up of a computer 2 and a printer 6 attached via a cable 4. The printer 6 includes a connection port 7 for attaching the cable 4 to the printer 6. Thus, a user using the computer 2 can select an item or other object to be printed on the printer 6.

Figure 2:
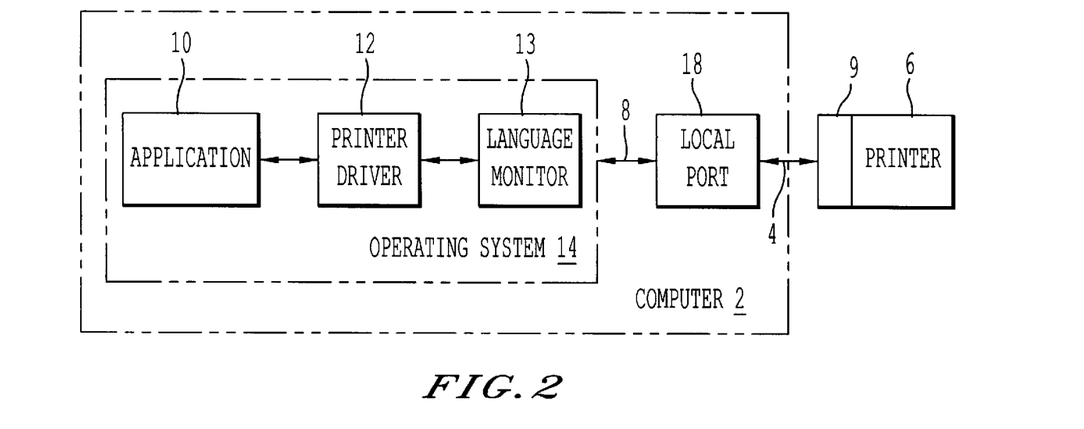
FIG. 2 is a block diagram illustrating functional components and data passed between a software application and a printer.

FIG. 2 illustrates a block diagram of a conventional application 10 (which may include a word processing utility such as the one sold under the trademark MICROSOFT WORD) interfacing the printer 6. The conventional application 10 is hosted on an operating system 14 resident on the computer 2. A user may print a desired object (e.g., document including text and/or an image, hereinafter referred to as a document) on the printer 6 using the application 10. A printer driver 12 and language monitor 13 are printer and operating system specific software interfaces, which control the user-requested print job. The operating system 14 sends signals in accordance with instructions from the printer driver 12 and language monitor 13 to the local port 18 via a connection 8, thus placing signals corresponding the printer driver 12 and language monitor 13 on the cable 4 connected to a parallel port 9 of the printer 6.

Figure 3:
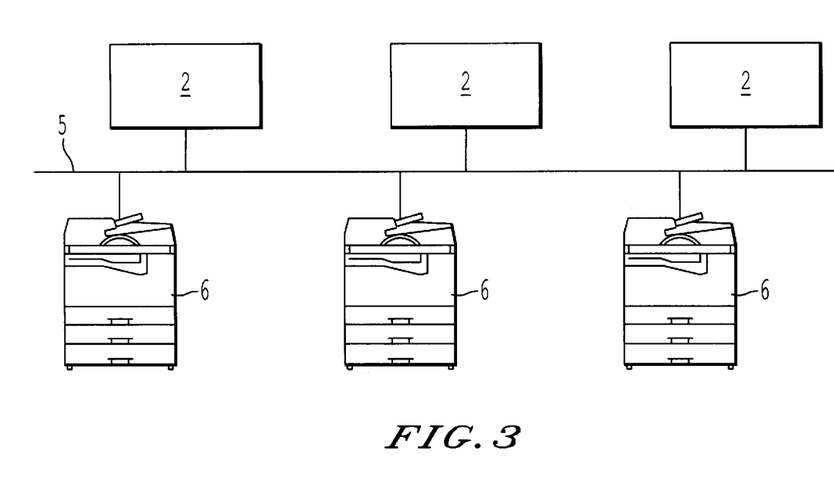
FIG. 3 illustrates a plurality of computers connected to a plurality of printers via a network.

Increasingly, a plurality of printers and computers are connected to a network, such as a Local Area Network (LAN). For example, FIG. 3 illustrates a plurality of computers 2 and printers 6 connected to each other via a network 5. The computers 2 and printers 6 illustrated in FIG. 3 are identified by the same reference numeral, however, the network may include many different computers and printers connected together.

In both of the examples discussed above (i.e., FIGS. 1–3), the user must designate a printer on which a file is to be printed (i.e, the name of the printer). In the example shown in FIG. 1, the printer name is always the same because there is only one printer. Thus, the user need only designate the printer a first time. In the example shown in FIG. 3, there are a plurality of available printers from which the user may choose. Thus, the user has the option of printing a document on any one of the plurality of printers.

In many cases, the selected printer is off-line or has other problems related to it so that the document cannot be printed on the printer. In these instances, the user is not notified that the print job has failed, but rather determines this by inspecting the selected printer and noticing that the file has not been printed. Then, the user must troubleshoot the problem and reprint the document.

Currently, there are available printer network management software packages (such as the one sold under the trademark HP JETADMIN), which continuously poll a predetermined set of printers or a single printer to determine whether or not the printer(s) are on-line (i.e., capable of being printed to). For example, HP JETADMIN may display the selected printer on the display of the user's computer in a color green, indicating that the printer is connected to the host computer. HP JETADMIN may also display, for example, one of the paper trays of the printer in a color red, which indicates that that particular paper tray is not operating. Based on results from continuously polling the printer (s), HP JETADMIN accordingly changes the color from red to green and vice versa. Thus, the user is able to view the displayed printer icon and determine whether or not to submit a print job to the selected printer.

However, a problem with HP JETADMIN and other network management software applications is they must continuously poll the printer(s). This increases the network traffic on the network, and thus reduces the efficiency of the network. Another problem with this type of printer management is that when a user opens a word processing utility, the window required for the word processing utility generally covers the displayed printer icon. Thus, the user is unable to see whether or not the printer icon is highlighted red or green. Therefore, the user is not able to determine whether the printer is on-line, etc., and must close the word processing window to see the status of the printer. This is a very cumbersome and tedious process.

SUMMARY OF THE INVENTION

Accordingly, one object of this invention is to solve the above-noted and other problems.

Another object of the present invention is to provide a novel method of notifying a user about a problem with a printer prior to the print job being sent to the printer.

Yet another object of the present invention is to provide a novel computer program product and corresponding graphical user interface which retrieves and displays problematic information about a printer when the user opts to print a file on the printer. Also provided are alternative options from which the user may choose if the printer is not functioning properly.

To achieve these and other objects, the present invention provides a method of printing a document, for example, on a recording medium of a printer selected by a user. Problematic information is retrieved about the printer in response to the printer being selected and before the print job is sent to the printer. The retrieved problematic information is displayed to the user. In addition, the problematic information may be retrieved, for example, by transmitting Simple Network Management Protocol (SNMP) commands to the printer, if the computer is connected to the printer via a network, or by transmitting printer job language commands if the computer is connected to the printer via a parallel port.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 4:
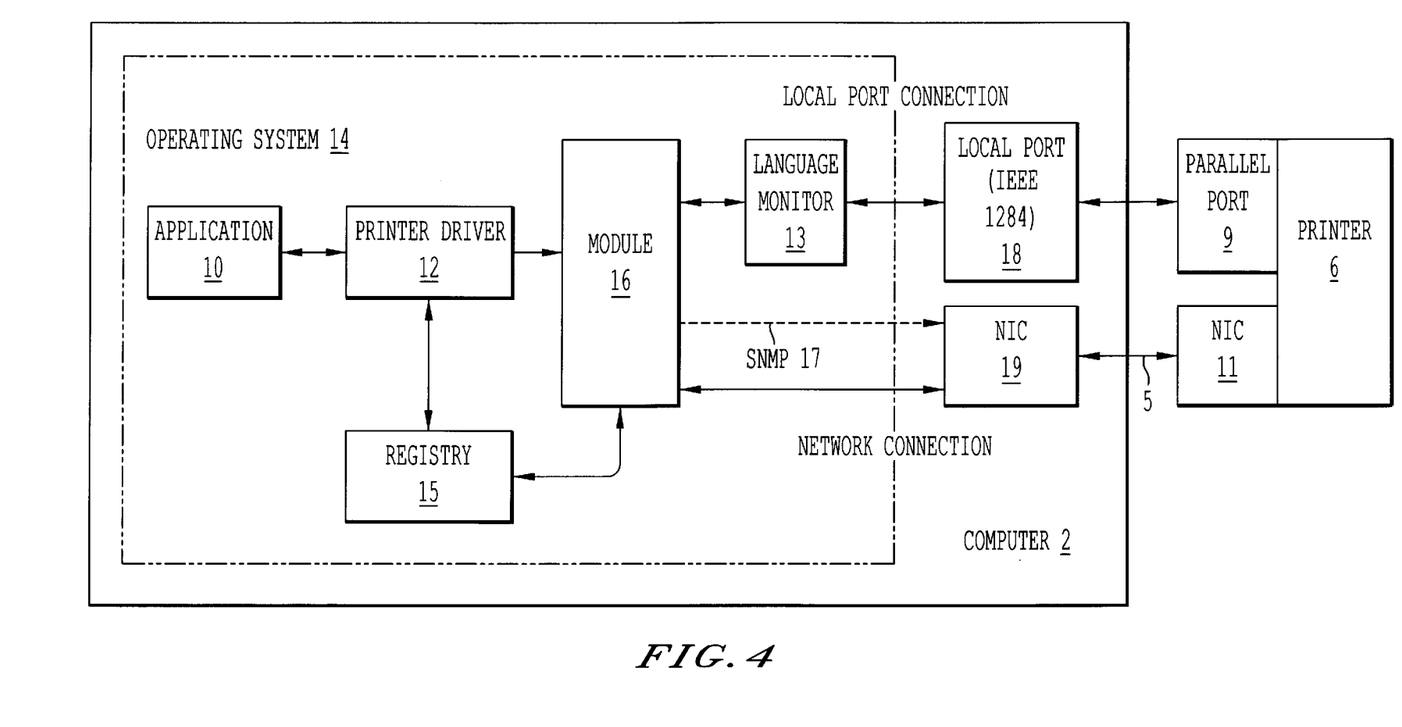
FIG. 4 is a block diagram illustrating functional components and data passed between a software application and a printer according to the present invention.

Referring now to the drawings, wherein like reference numerals designate identical or corresponding parts throughout the several views, FIG. 4 is a block diagram illustrating functional components and data passed between a software application 10 and a printer 6 according to the present invention. One difference between the block diagram shown in FIG. 4 and that shown in FIG. 2 is that the present invention includes a module 16, which is an executable program. The module 16 may be loaded onto the computer 2 via a computer storage medium, such as a CD-ROM, tape, disk or memory chip/card, the Internet (i.e., by downloading the module 16), etc. FIG. 4 also illustrates SNMP commands 17 used by the module 16 to retrieve problematic information from the printer 6, and a registry 15, which is a system specific database in which computer/printer information is stored. The module 16 executes SNMP commands 17 to retrieve problematic information from the printer 6 via a network interface card (NIC) 19 of the computer 2, the network 5 and a NIC 11 of the printer 6. This retrieved problematic information may then be displayed on a display of the computer 2. The present invention is not limited to SNMP, and other protocols may be used. However, for simplicity purposes, the present invention is described with reference to SNMP. In addition, FIG. 4 illustrates the computer 2 connected to the printer 6 via 1) the parallel port 9, and 2) the network 5. However, in practice, only one type of connection is used.

The term SNMP refers to a collection of specifications for network management that includes the SNMP protocol itself, the definition of a database, and associated concepts. The "basic" SNMP is now in wide spread use. Virtually all major venders of host computers, workstations, bridges, routers, hubs, etc. offer basic SNMP. SNMP gives a network manager or user the ability to monitor subnetworks as a whole rather than just individual devices on the subnetwork. In addition, SNMP defines a Management Information Base (MIB), which is a database containing information about the elements to be managed. Each resource to be managed is represented by an object in the MIB. The MIB is a structured collection of such objects. Each node in the network may maintain a MIB that reflects the status of the managed resources at that node. A network-management entity may monitor their resources at that node by reading the values of objects in the MIB and may control the resources of that node by modifying those values. The Structure of Management Information (SMI), which defines a general framework in which a MIB can be defined and constructed, identifies the data types that can be used in the MIB and how resources within the MIB are represented and named. The philosophy behind SMI is to encourage simplicity and sensibility within the MIB. Thus, the MIB may store only simple data types: scalars and two-dimensional scalar arrays. In addition, the "basic" MIB may include private extensions (i.e., user developed extensions). The present invention includes such a private extension.

One example of a private MIB item, according to the present invention, is shown below in Table 1. This is a private extension to the MIB, and is used to retrieve problematic information about a printer. Thus, when the host computer sends this MIB item to the printer (i.e., via a GetRequest SNMP command), the printer returns an integer value, such as "5," which indicates a paper jam has occurred in the printer.

In more detail, SNMP provides Protocol Data Units (PDUs), which are essentially commands that may be transmitted to a device (e.g., a printer) to request information. One such PDU is the GetRequest ($p_1, p_2, p_3, \ldots$) PDU. The parameters $p_1$, $p_2$, $p_3$, etc., include, for example, an object name, object identifier (ODI) and a target address (i.e., the address of the printer, for example). Thus, referring to Table 1, the module 16 may execute a GetRequest (RicohEngOptionIdentifyNumber, 1.3.6.1.4.1.367.3.2.1.2.4, 80.3.2.1) to the printer 6. The parameters $p_1$, $p_2$ and $p_3$ in this GetRequest PDU respectfully correspond to the object name of the MIB item, the object identifier and the target address of the printer 6. Then, the NIC 11 (see FIG. 4) on the printer 6 returns a value of "5" (as an example), which indicates the printer 6 has a paper jam.

Another SNMP PDU is the GetNextRequest ($p_1, p_2, p_3$) PDU, which is almost identical to the GetRequest ($p_1, p_2, p_3$) PDU. The GetNextRequest ($p_1, p_2, p_3$) PDU may be executed by the module 16 to retrieve additional printer information. For example, assume the module 16 executes the GetNextRequest command, and the NIC 11 of the printer 6 returns an integer value of "1." This means the printer 6 is out of paper.

Further details of the SNMP MIB and other SNMP concepts may be found in the book: William Stallings, *SNMP, SNMPv2, and CMIP: The Practical guide to Network-Management Standards* (Addison-Wesley Publishing Company, 1993), which is incorporated herein by reference in its entirety.

TABLE 1

PRIVATE MIB ITEM

RicohEngOptionIdentifyNumber
STATUS current
DESCRIPTION
  "hrPrinterDetectedErrorState OBJECT-TYPE
  SYNTAX OCTET STRING
  ACCESS read-only
  STATUS mandatory
DESCRIPTION
  "This object represents any error conditions detected by the printer. The error conditions are encoded as bits in an octet string, with the following definitions:

| Condition | Bit # | hrDeviceStatus |
|---|---|---|
| lowPaper | 0 | warning(3) |
| noPaper | 1 | down(5) |
| lowToner | 2 | warning(3) |
| noToner | 3 | down(5) |
| doorOpen | 4 | down(5) |
| jammed | 5 | down(5) |
| offline | 6 | down(5) |
| serviceRequested | 7 | warning(3) |

If multiple conditions are currently detected and the hrDeviceStatus would not otherwise be unknown(1) or testing(4), the hrDeviceStatus shall TABLE 1-continued

PRIVATE MIB ITEM correspond to the worst state of those indicated, where down(5) is worse than warning(3) which is worse than running(2).
Bits are numbered starting with the most significant bit of the first byte being bit 0, the least significant bit of the first byte being bit 7, the most significant bit of the second byte being bit 8, and so on. A one bit encodes that the condition was detected, while a zero bit encodes that the condition was not detected.
SYNTAX INTEGER {
low paper(o),
no paper(1),
lowToner(2),
noToner(3),
doorOpen(4),
jammed(5),
offline(6),
serviceRequested(7) }

Thus, referring again to FIG. 4, the module 16 retrieves problematic information from the printer 6 connected to the computer 2 via the network 5 using SNMP commands. The registry 15 is then updated to include the problematic information.

Figure 5:
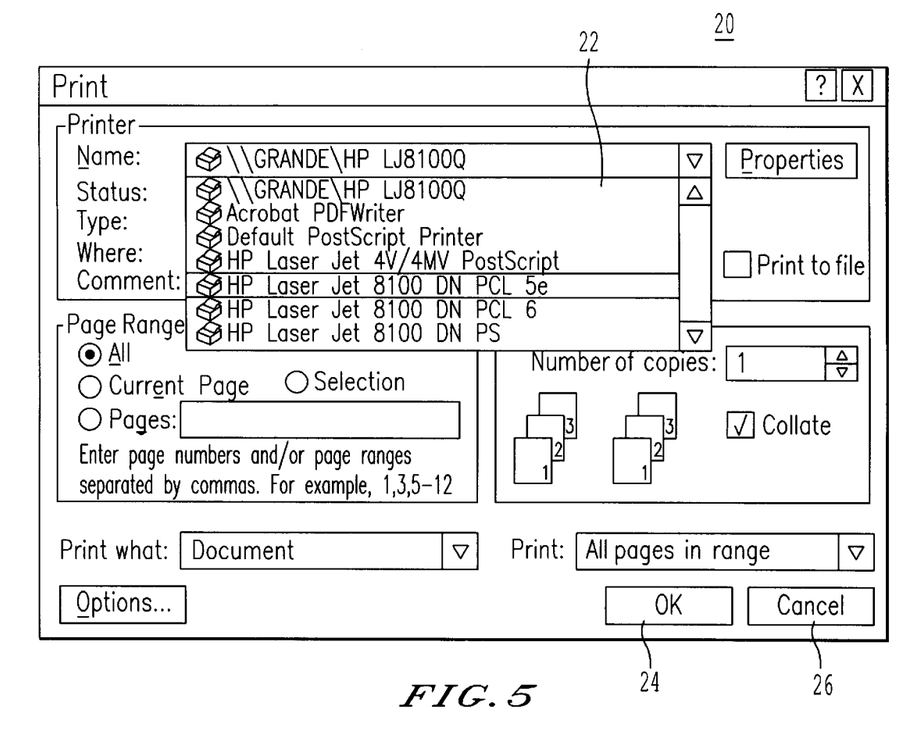
FIG. 5 is a MICROSOFT WORD window, which is displayed when a user selects a file to be printed.

Turning now to FIG. 5, FIG. 5 illustrates a printer dialog 20 that pops up on a display of the computer when the user selects the "File" icon and then the "Print" icon from the main menu bar in a MICROSOFT WORD document, for example. The printer dialog 20 includes a plurality of printers in a first display region 22, an OK push button 24 and a CANCEL push button 24. The OK push button 24 and CANCEL push button 24 are known push buttons. Thus, to print a document, the user may first select a printer from the first display region 22 and then select the OK push button 24. If the desired printer is already highlighted (i.e., a default printer), the user need only select the OK push button 24. Selecting the OK push button 24 causes the application 10 and printer driver 12 to begin processing the requested print job.

After the user selects the OK push button 24, the module 16 receives the print command from the printer driver 12 and determines from this command which printer is selected. The module 16 then sends SNMP commands to the selected printer to determine if any problematic information exists from the printer 6. If the module 16 retrieves problematic information from the selected printer 6, this information is updated in the registry 15. The printer driver 12 may then retrieve (i.e., read) the problematic information from the registry 15 by using a windows registry API. A graphical user interface (GUI) is also displayed to the user to reflect any retrieved problematic information from the printer. The GUI is discussed in more detail later. If there is no problematic information from the printer 6 (i.e., the printer is on-line without any paper jams, etc.), the module 16 merely passes the printer command from the printer driver 12 to the printer 6 via the NIC card 19 of the computer 2, the network 5 and the NIC 11 of the printer 6.

Figure 6:
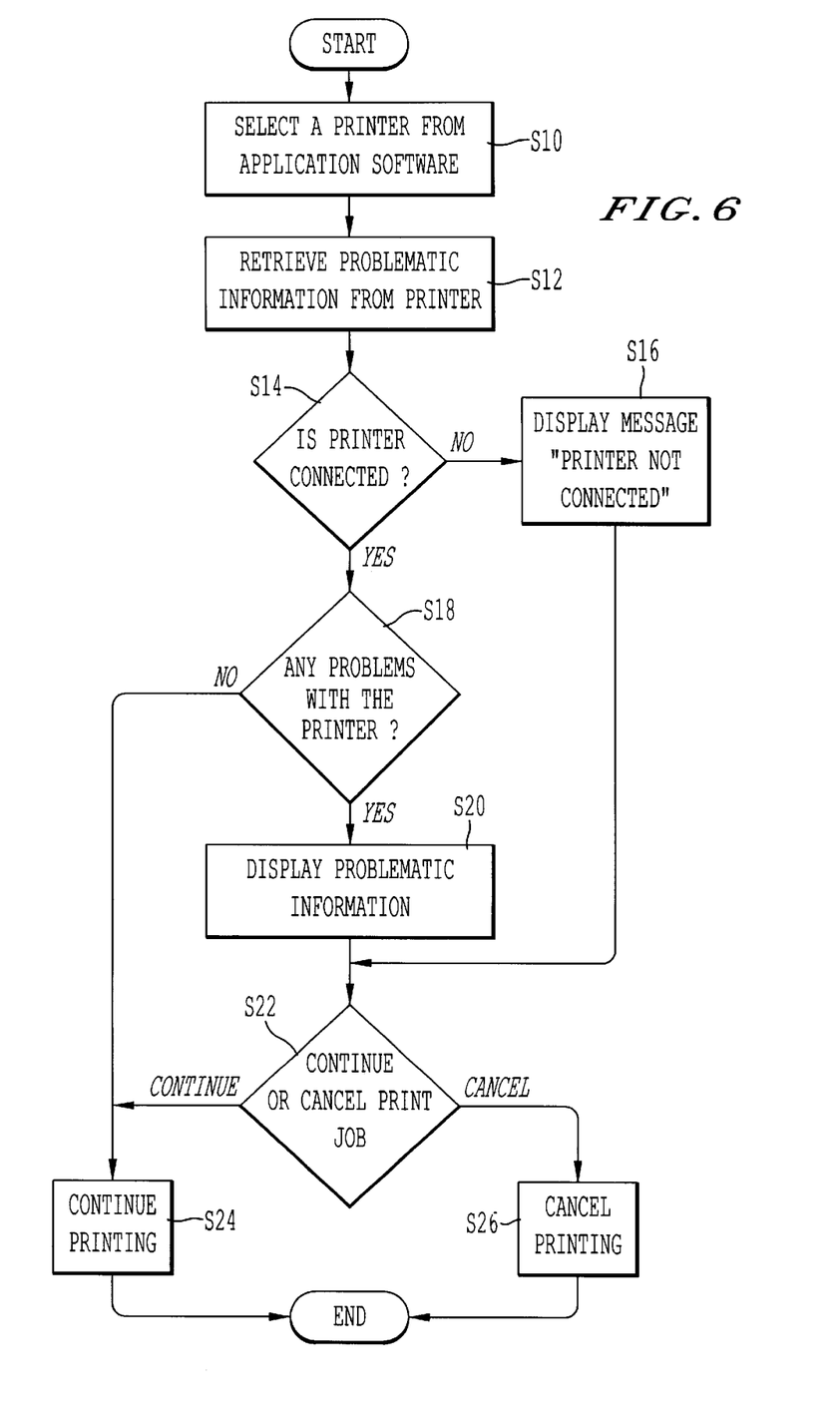
FIG. 6 is a flow chart illustrating the operational steps of the printing method and related computer program product according to the present invention.

An example of the operational steps of the module 16 will now be explained in more detail with reference to FIG. 6 (this example will refer to MICROSOFT WORD as the word processing software). As shown in FIG. 6, a user first selects a printer from MICROSOFT WORD (step S10). Note, if the printer displayed in the MICROSOFT WORD window is the one the user wants to print to, the user does not need to perform the step of selecting a printer (i.e., this step was performed previously). That is, the user may simply select an OK push button, for example, to begin printing.

Then, any problematic information is retrieved from the printer (step S12). It is determined in step S14 if the printer is connected to the computer 2. To determine if a bidirectional printer is connected to the computer, the call "ReadPort" API may be used. The structure of this call is as follows: BOOL ReadPort (HANDLE hPort, LPBYTE pBuffer, DWORD cbBuf, LPDWORD pcbRead); The ReadPort function supports bidirectional printers. If there is any data in the printer, the ReadPort function returns all the data. If there is any data in the printer, the ReadPort function returns all the data. If there is no response from the printer, the ReadPort function waits long enough to ensure that there is no data coming from the printer and then returns an error. If the printer is not connected (no in step S14), a message is popped up on the display of the computer indicating that the printer is not connected to the computer (step S16). The display message may be included, for example, in an error dialog 30 shown in FIG. 7A, which includes a Continue Printing push button 36 and a Cancel Printing push button 38. Thus, the user may continue or cancel the print job (step S22). If the user cancels the print job, the print job is canceled by the printer driver 12 in step S26. Alternatively, if the user wishes to continue printing, the user may first fix the indicated problem (e.g., by connecting the printer 6 to the computer 2) and then select the Continue Printing push button 36. The print job is then sent to the printer 6 by the printer driver 12 (step S24).

If the printer is already connected to the computer 2 (yes in step S14), the module 16 transmits SNMP commands to the printer 6 to retrieve any problematic information (step S18) as discussed above. If there is any problematic information retrieved (yes in step S18), the problematic information is displayed via an error dialog on a display of the computer 2 (for example, see the error dialog 50 in FIG. 7B). After the problematic information is displayed to the user, the user may to continue or cancel the print job as discussed above. If there are no problems with the printer (no in step S18), the printer driver 12 sends the print job to the printer 6 and the process ends.

Figure 7A:
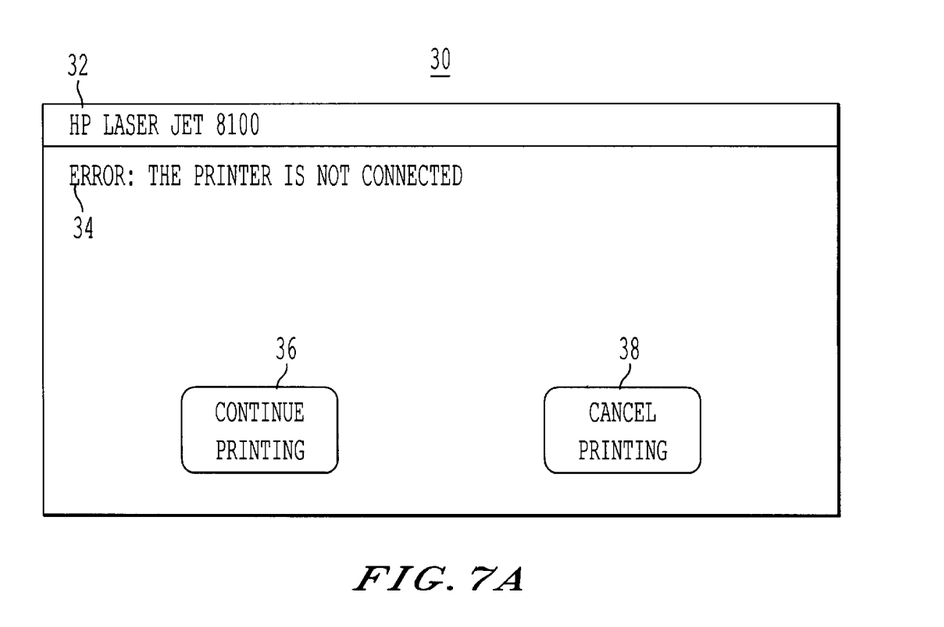
FIG. 7a is one example of an error dialog indicating problematic information about a printer according to the present invention.
Figure 7B:
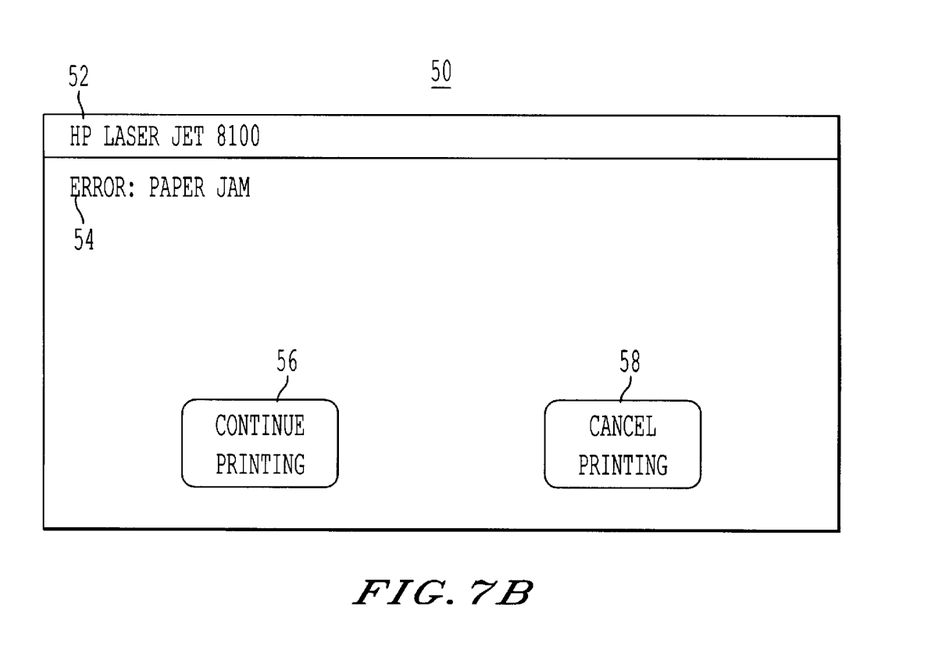
FIG. 7b is another example of an error dialog indicating problematic information about a printer according to the present invention.

FIGS. 7A and 7B illustrate examples of error dialogs that may be popped up on a display of the computer 2 indicating that problematic information exists for the printer selected. In particular, FIG. 7A illustrates an error dialog 30, which indicates that the printer is not connected to the computer. The message that the printer is not connected is displayed in a first display area 34, and the selected printer is displayed in a second display area 32. In addition, the error dialog 30 includes a Continue Printing push button 36, and a Cancel Printing push button 38, as discussed above. FIG. 7B is similar to FIG. 7A, but indicates a paper jam in a first display area 54 for the selected printer identified in a second display area 52. The Continue Printing push button 56 and Cancel Printing push button 58 are the same type of pushbuttons as shown in FIG. 7A.

As discussed above, the module 16 is an executable program. The executable program may be developed using any suitable programming language, such as C, C++, Fortran, etc.

As discussed above, the present invention provides the user with problematic information about the printer prior to a document being printed. Thus, the user does not waste time waiting for a print job that is unable to print due to a problem with the printer.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional computer circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical disks, CD-ROMs and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A method of printing, comprising the steps of:
   selecting a printer for printing a file resident on a computer;
   retrieving problematic information about the printer in response to the printer being selected in the selecting step, and before the file is attempted to be printed on a recording medium of the printer, by transmitting Simple Network Management Protocol (SNMP) commands to the printer so as to retrieve the problematic information about the printer, if the computer is connected to the printer via a network;
   updating a registry of the computer to include the problematic information retrieved in the retrieving step;
   reading the registry including the problematic information updated in the updating step; and
   displaying the problematic information read in the reading step on a display of the computer.

2. The method according to claim 1, wherein the problematic information retrieved in the retrieving step indicates the printer selected in the selecting step is not connected to the computer.

3. The method according to claim 1, wherein the problematic information retrieved in the retrieving step indicates at least one of 1) a paper is jammed in the printer, 2) a toner is low in the printer, 3) a power of the printer is off, and 4) the printer is out of paper.

4. The method according to claim 1, further comprising the step of:
   setting the printer selected in the selecting step to be a default printer.

5. A method of printing, comprising the steps of:
   selecting a printer for printing a file resident on a computer;
   retrieving problematic information about the printer in response to the printer being selected in the selecting step, and before the file is attempted to be printed on a recording medium of the printer, by transmitting printer job language commands to the printer via a language monitor resident on the computer so as to retrieve the problematic information about the printer, if the computer is connected to the printer via a parallel port;
   updating a registry of the computer to include the problematic information retrieved in the retrieving step;
   reading the registry including the problematic information updated in the updating step; and
   displaying the problematic information read in the reading step on a display of the computer.

6. The method according to claim 5, wherein the printer job language commands include at least one of 1) Postscript commands, and 2) Printer Job Language (PJL) commands.

7. The method according to claim 5, wherein the problematic information retrieved in the retrieving step indicates the printer selected in the selecting step is not connected to the computer.

8. The method according to claim 5, wherein the problematic information retrieved in the retrieving step indicates at least one of 1) a paper is jammed in the printer, 2) a toner is low in the printer, 3) a power of the printer is off, and 4) the printer is out of paper.

9. The method according to claim 5, further comprising the step of:
   setting the printer selected in the selecting step to be a default printer.

10. The method according to claim 5, wherein the displaying step displays options to the user to bypass the problematic information retrieved in the retrieving step.

11. The method according to claim 10, wherein the options displayed in the displaying step include at least one of 1) an option to continuing printing the file and 2) an option to cancel printing the file.

12. A method of printing, comprising the steps of:
    selecting a printer for printing a file resident on a computer;
    retrieving problematic information about the printer in response to the printer being selected in the selecting step, and before the file is attempted to be printed on a recording medium of the printer; and
    displaying the problematic information retrieved in the retrieving step,
    wherein the displaying step displays options to the user to bypass the problematic information retrieved in the retrieving step.

13. The method according to claim 12, wherein the options displayed in the displaying step include at least one of 1) an option to continuing printing the file and 2) an option to cancel printing the file.

14. The method according to claim 12, wherein the problematic information retrieved in the retrieving step indicates the printer selected in the selecting step is not connected to the computer.

15. The method according to claim 12, wherein the problematic information retrieved in the retrieving step indicates at least one of 1) a paper is jammed in the printer, 2) a toner is low in the printer, 3) a power of the printer is off, and 4) the printer is out of paper.

16. The method according to claim 12, further comprising the step of:
    setting the printer selected in the selecting step to be a default printer.

17. The method according to claim 12, wherein the options displayed in the displaying step include at least one of 1) an option to continuing printing the file and 2) an option to cancel printing the file.

18. A computer readable medium comprising a computer program product executing on a computer, said computer program product comprising:
    a first computer code configured to select a printer for printing a file resident on a computer;
    a second computer code configured to retrieve problematic information about the printer in response to the printer being selected by the first computer code, and before the file is attempted to be printed on a recording medium of the printer, by transmitting Simple Network Management Protocol (SNMP) commands to the printer so as to retrieve the problematic information about the printer, if the computer is connected to the printer via a network;

a third computer code configured to update a registry of the computer to include the retrieved problematic information;

a fourth computer code configured to read the registry including the problematic information updated by the third computer code; and a fifth computer code configured to display the problematic information read by the fourth computer code on a display of the computer.

19. The computer readable medium according to claim 18, wherein the problematic information retrieved by the second computer code indicates the printer selected in the selecting step is not connected to the computer.

20. The computer readable medium according to claim 18, wherein the problematic information retrieved by the second computer code indicates at least one of 1) a paper is jammed in the printer, 2) a toner is low in the printer, 3) a power of the printer is off, and 4) the printer is out of paper.

21. The computer readable medium according to claim 18, further comprising:

a sixth computer code configured to set the printer selected by the first computer code to be a default printer.

22. A computer readable medium comprising a computer program product executing on a computer, said computer program product comprising:

a first computer code configured to select a printer for printing a file resident on a computer;

a second computer code configured to retrieve problematic information about the printer in response to the printer being selected by the first computer code, and before the file is attempted to be printed on a recording medium of the printer, by transmitting printer job language commands to the printer via a language monitor resident on the computer so as to retrieve the problematic information about the printer, if the computer is connected to the printer via a parallel port;

a third computer code configured to update a registry of the computer to include the retrieved problematic information;

a fourth computer code configured to read the registry including the updated problematic information; and a fifth computer code configured to display the problematic information read by the fourth computer code on a display of the computer.

23. The computer readable medium according to claim 22, wherein the printer job language commands include at least one of 1) Postscript commands, and 2) Printer Job Language (PJL) commands.

24. The computer readable medium according to claim 22, wherein the problematic information retrieved by the second computer code indicates the printer selected in the selecting step is not connected to the computer.

25. The computer readable medium according to claim 22, wherein the problematic information retrieved by the second computer code indicates at least one of 1) a paper is jammed in the printer, 2) a toner is low in the printer, 3) a power of the printer is off, and 4) the printer is out of paper.

26. The computer readable medium according to claim 22, further comprising:

a fourth computer code configured to set the printer selected by the first computer code to be a default printer.

27. The computer readable medium according to claim 22, wherein the third computer code displays options to the user to bypass the problematic information retrieved by the second computer code.

28. The computer readable medium according to claim 27, wherein the options displayed by the third computer code include at least one of 1) an option to continuing printing the file and 2) an option to cancel printing the file.

29. A computer readable medium comprising a computer program product executing on a computer, said computer program product comprising:

a first computer code configured to select a printer for printing a file resident on a computer;

a second computer code configured to retrieve problematic information about the printer in response to the printer being selected by the first computer code, and before the file is attempted to be printed on a recording medium of the printer; and a third computer code configured to display the problematic information retrieved by the second computer code, wherein the third computer code displays options to the user to bypass the problematic information retrieved by the second computer code.

30. The computer readable medium according to claim 29, wherein the options displayed by the third computer code include at least one of 1) an option to continuing printing the file and 2) an option to cancel printing the file.

31. The computer readable medium according to claim 29, wherein the problematic information retrieved by the second computer code indicates the printer selected in the selecting step is not connected to the computer.

32. The computer readable medium according to claim 29, wherein the problematic information retrieved by the second computer code indicates at least one of 1) a paper is jammed in the printer, 2) a toner is low in the printer, 3) a power of the printer is off, and 4) the printer is out of paper.

33. The computer readable medium according to claim 29, further comprising:

a fourth computer code configured to set the printer selected by the first computer code to be a default printer.

34. The computer readable medium according to claim 29, wherein the options displayed by the third computer code include at least one of 1) an option to continuing printing the file and 2) an option to cancel printing the file.

35. A system of printing, comprising:

means for selecting a printer for printing a file resident on a computer;

means for retrieving problematic information about the printer in response to the printer being selected by the selecting means, and before the file is attempted to be printed on a recording medium of the printer, by transmitting Simple Network Management Protocol (SNMP) commands to the printer so as to retrieve the problematic information about the printer, if the computer is connected to the printer via a network;

means for updating a registry of the computer to include the problematic information retrieved by the retrieving means;

means for reading the registry including the problematic information updated by the updating means; and means for displaying the problematic information read by the reading means on a display of the computer.

36. The system according to claim 35, wherein the problematic information retrieved by the retrieving means indicates the printer selected by the selecting means is not connected to the computer.

37. The system according to claim 35, wherein the problematic information retrieved by the retrieving means indicates at least one of 1) a paper is jammed in the printer, 2) a toner is low in the printer, 3) a power of the printer is off, and 4) the printer is out of paper.

38. The system according to claim 35, further comprising:

means for setting the printer selected by the selecting means to be a default printer.

39. A system of printing, comprising:

means for selecting a printer for printing a file resident on a computer;

means for retrieving problematic information about the printer in response to the printer being selected by the selecting means, and before the file is attempted to be printed on a recording medium of the printer, by transmitting printer job language commands to the printer via a language monitor resident on the computer so as to retrieve the problematic information about the printer, if the computer is connected to the printer via a parallel port;

means for updating a registry of the computer to include the problematic information retrieved by the retrieving means;

means for reading the registry including the problematic information updated by the updating means; and means for displaying the problematic information read by the reading means on a display of the computer.

40. The system according to claim 39, wherein the printer job language commands include at least one of 1) Postscript commands, and 2) Printer Job Language (PJL) commands.

41. The system according to claim 39, wherein the problematic information retrieved by the retrieving means indicates the printer selected by the selecting means is not connected to the computer.

42. The system according to claim 39, wherein the problematic information retrieved by the retrieving means indicates at least one of 1) a paper is jammed in the printer, 2) a toner is low in the printer, 3) a power of the printer is off, and 4) the printer is out of paper.

43. The system according to claim 39, further comprising:

means for setting the printer selected by the selecting means to be a default printer.

44. The system according to claim 39, wherein the displaying means displays options to the user to bypass the problematic information retrieved by the retrieving means.

45. The system according to claim 44, wherein the options displayed by the displaying means include at least one of 1) an option to continuing printing the file and 2) an option to cancel printing the file.

46. A system of printing, comprising:

means for selecting a printer for printing a file resident on a computer;

means for retrieving problematic information about the printer in response to the printer being selected by the selecting means, and before the file is attempted to be printed on a recording medium of the printer; and means for displaying the problematic information retrieved by the retrieving means, wherein the displaying means displays options to the user to bypass the problematic information retrieved by the retrieving means.

47. The system according to claim 46, wherein the options displayed by the displaying means include at least one of 1) an option to continuing printing the file and 2) an option to cancel printing the file.

48. The system according to claim 46, wherein the problematic information retrieved by the retrieving means indicates the printer selected by the selecting means is not connected to the computer.

49. The system according to claim 46, wherein the problematic information retrieved by the retrieving means indicates at least one of 1) a paper is jammed in the printer, 2) a toner is low in the printer, 3) a power of the printer is off, and 4) the printer is out of paper.

50. The system according to claim 46, further comprising:

means for setting the printer selected by the selecting means to be a default printer.

51. The system according to claim 46, wherein the options displayed by the displaying means include at least one of 1) an option to continuing printing the file and 2) an option to cancel printing the file.

52. A graphical user interface comprising:

a first parent window including:

a first display control configured to select at least one printer for printing a file resident on a computer;

a second display control configured to retrieve problematic information about the at least one printer in response to the first display control being selected, and before the file is attempted to be printed on a recording medium of the at least one printer.

53. The graphical user interface according to claim 52, further comprising:

a child window including a first display control configured to display the retrieved problematic information about the at least one printer.

54. The graphical user interface according to claim 53, wherein the child window further includes:

a second display control configured to continue printing the file; and a third display control configured to cancel printing the file.

55. The graphical user interface according to claim 53, wherein the first child window further includes:

a second display control configured to display a name of the printer selected by the first display control.

* * * * *